(No Model.) 2 Sheets—Sheet 1.

T. R. FERRALL.
ANTI FRICTIONAL BEARING.

No. 255,426. Patented Mar. 28, 1882.

Witnesses.
Henry Chadbourne.
Sarah M. Goodrich.

Inventor.
Thomas R. Ferrall
by Alban Andrew
his atty.

N. PETERS, Photo-Lithographer, Washington, D. C.

(No Model.) 2 Sheets—Sheet 2.

T. R. FERRALL.
ANTI FRICTIONAL BEARING.

No. 255,426. Patented Mar. 28, 1882.

Witnesses.
Henry Chadbourn.
Sarah M Goodrich

Inventor.
Thomas R. Ferrall.
by Alban Andrew
his atty

UNITED STATES PATENT OFFICE.

THOMAS R. FERRALL, OF BOSTON, MASSACHUSETTS.

ANTI-FRICTIONAL BEARING.

SPECIFICATION forming part of Letters Patent No. 255,426, dated March 28, 1882.

Application filed February 6, 1882. (No model.)

*To all whom it may concern:*

Be it known that I, THOMAS R. FERRALL, a citizen of the United States, residing at Boston, in the county of Suffolk and State of Massachusetts, have invented certain new and useful Improvements in Anti-Frictional Bearings; and I do hereby declare that the same are fully described in the following specification and illustrated in the accompanying drawings.

This invention relates to improvements on anti-frictional bearings; and it is carried out as follows, reference being had to the accompanying drawings, on which—

Figure 1:
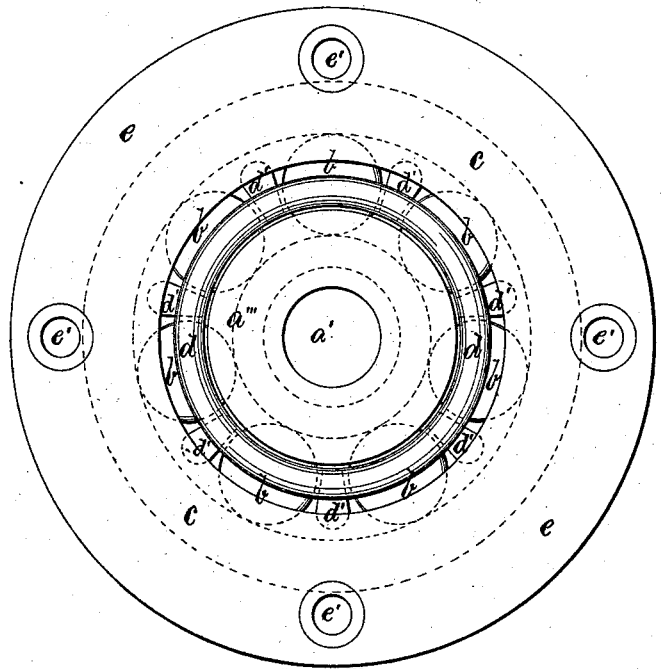
Figure 2:
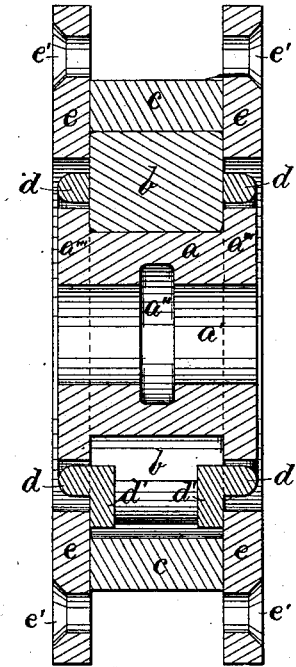
Figure 3:
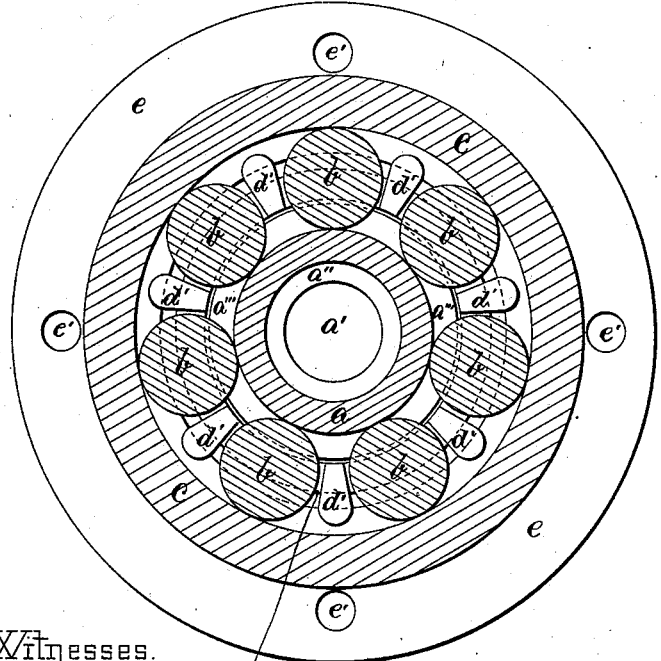
Figure 4:
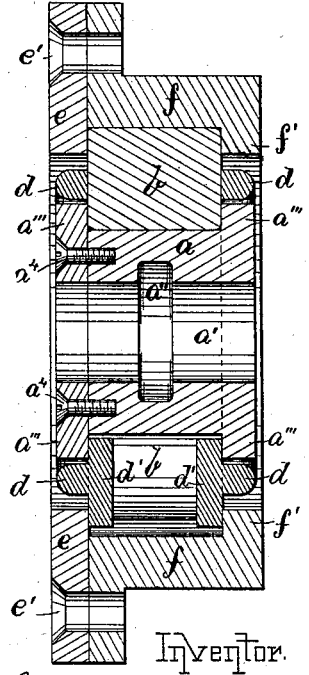
Figure 5:
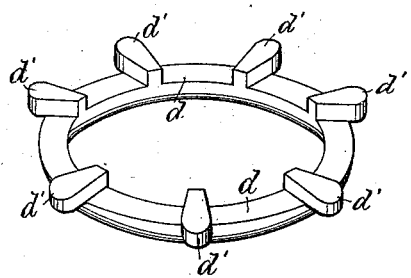
Figure 6:
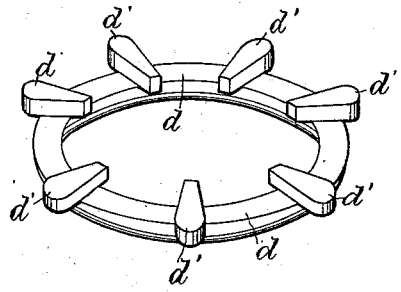

Figure 1 represents an end elevation of the improved anti-frictional bearing. Fig. 2 represents a central longitudinal section, and Fig. 3 represents a cross-section, of the rollers and central bearing-sleeve. Fig. 4 represents a modification of the invention. Fig. 5 represents a perspective view of one of the regulators, and Fig. 6 represents a modification of the same.

Similar letters refer to similar parts, wherever they occur, on the different parts of the drawings.

$a$ represents the central bearing-sleeve, having circular perforation $a'$ for the reception of the pin or axle for which the anti-frictional bearing is intended.

$a''$ is an annular groove on the inside of the sleeve $a$, which groove is adapted to contain a proper amount of lubricating material, so as to keep the journal properly lubricated for a considerable length of time. As a substitute for the internal annular groove, $a''$, a number of recesses may be made on the interior surface of the sleeve-bearing $a$.

$b\ b\ b$ are the anti-frictional rollers, arranged on the outer periphery of the sleeve-bearing $a$, as shown in Figs. 1, 2, and 3.

$c$ is the annular ring or shell, surrounding and inclosing the rollers $b\ b\ b$.

$a'''\ a'''$ are annular and outwardly-projecting flanges in the two ends of the sleeve-bearing $a$, between which flanges the rollers $b\ b\ b$ are kept from moving longitudinally.

$d\ d$ are the annular regulators, one in each end of the rollers $b\ b\ b$. Each of the regulators $d$ is provided with radial projections $d'\ d'$ between each successive pair of rollers, as shown. The radial projections $d'\ d'$ project beyond the annular regulators, as shown in the lower part of Fig. 2, and beneath the inner edges of the annular end plates, $e\ e$, by which arrangement the outer parts of the radial projections $d'\ d'$ serve as stops against the insides of said plates $e\ e$ to prevent said regulators from moving outward in the axial directions of the rollers $b\ b\ b$. The plates $e\ e$ are provided with screw-holes $e'\ e'$, through which suitable screws or bolts are inserted for securing said plates to the wooden block or other stationary object to which they are to be secured. It will thus be seen that the inner edges of the annular plates $e\ e$ serve as stops both for the rollers $b\ b$ and for the regulators $d\ d'$, and the latter serve as stops and dividers for the rollers $b\ b\ b$, and the latter serve to prevent a longitudinal motion of the central bearing-sleeve, $a$, and in this manner I obtain a very simple and durable anti-frictional bearing of great strength.

In the modification shown in Fig. 4 only one annular plate $e$ is used in combination with the shell $f$, secured to said plate $e$, and provided with an inwardly-projecting annular lip, $f'$, to confine the rollers $b\ b\ b$ from longitudinal motion in the direction of their axis.

Another modification of the invention may be carried out in the following manner, viz: by making the radial projections $d'\ d'$ of the regulator-rings $d\ d$ to project inward, as shown in Fig. 6, and beneath the flanges $a'''\ a'''$ of the sleeve-bearing $a$, in which case one of the said flanges $a'''$ is made detachable from the sleeve-bearing $a$ and secured to it by means of screws or rivets $a^4\ a^4$, as shown in Fig. 4.

What I wish to secure by Letters Patent, and claim, is—

In an anti-frictional bearing, the combination of central sleeve-bearing, $a$, its lubricator-channel $a''$, flanges $a'''\ a'''$, rollers $b\ b\ b$, the regulators $d\ d$, with their radial projections $d'\ d'$, and the ring-casing $c$, or its equivalent, and the annular plates $e\ e$, or their described equivalents, as set forth.

In testimony whereof I have affixed my signature in presence of two witnesses.

THOMAS R. FERRALL.

Witnesses:
ALBAN ANDRÉN,
EDWARD O. LORD.